United States Patent
Schrapp et al.

(10) Patent No.: US 6,997,517 B1
(45) Date of Patent: Feb. 14, 2006

(54) VENTILATED SNOWMOBILE SEAT

(75) Inventors: Nick Schrapp, Roseau, MN (US); Jason Eichenberger, Warroad, MN (US)

(73) Assignee: Polaris Industries Inc., Medina, MN (US)

( * ) Notice: Subject to any disclaimer, the term of this patent is extended or adjusted under 35 U.S.C. 154(b) by 307 days.

(21) Appl. No.: 10/348,614

(22) Filed: Jan. 21, 2003

(51) Int. Cl.
*A47C 7/02* (2006.01)

(52) U.S. Cl. .............. 297/452.42; 297/195.11; 180/182

(58) Field of Classification Search .......... 297/195.1, 297/195.11, 452.42, 452.46, 452.47, 452.43; 180/182; 280/8; 114/363
See application file for complete search history.

(56) References Cited

U.S. PATENT DOCUMENTS

| | | | |
|---|---|---|---|
| 3,137,523 A | 6/1964 | Kamer | |
| 3,323,152 A * | 6/1967 | Lerman | 5/655.9 |
| 3,681,797 A * | 8/1972 | Messner | 297/180.13 |
| 5,353,734 A | 10/1994 | Tani | |
| 5,411,318 A * | 5/1995 | Law | 297/452.45 |
| 5,735,229 A | 4/1998 | House et al. | |
| 5,833,321 A * | 11/1998 | Kim et al. | 297/452.42 |
| 5,918,564 A * | 7/1999 | Ohtsuka et al. | 114/363 |
| 6,086,149 A | 7/2000 | Atherley | |
| 6,106,057 A | 8/2000 | Lee | |
| 6,371,233 B1 * | 4/2002 | Ishii | 180/182 |
| 6,481,801 B1 | 11/2002 | Schmale | |
| 6,585,317 B1 * | 7/2003 | Atherley | 297/195.11 |

* cited by examiner

*Primary Examiner*—Laurie K. Cranmer
(74) *Attorney, Agent, or Firm*—Fredrikson & Byron, P.A.

(57) ABSTRACT

A snowmobile seat having a ventilation system for allowing moisture that enters the cushion portion of the seat to be wicked away through a base section that is disposed between the tunnel of the snowmobile and the cushion. The base section provides ventilation spaces between the base section and tunnel and has ventilation holes there through that allow the moisture to be drawn away from the cushion. Grooves formed in the underside of the cushion and channels formed in the top side of the base section also help promote this process.

22 Claims, 8 Drawing Sheets

VENTILATED SNOWMOBILE SEAT

FIELD OF THE INVENTION

The preferred embodiments of the present invention relate to a ventilated snowmobile seat. More particularly, the preferred embodiments relate to a snowmobile seat that allows moisture that enters a cushion section of the seat to be wicked away thereby providing a more comfortable seat for the rider as well as a prolonged life for the seat material.

BACKGROUND OF THE INVENTION

One issue with typical snowmobile seats is that they absorb moisture. While covers disposed over the seats are sometimes water resistant, moisture can still seep in through the seams. Also, the cover may tear thereby allowing moisture to enter the seat cushion. The cushions are typically made of open-celled foam that absorbs water. The cushion tends to act like a sponge soaking up water. Absorbed moisture affects the performance and life of the cushion. Moisture can not only cause the cushion to deteriorate but also, a cold and wet seat is uncomfortable for the rider. In addition, the seat may freeze and make the seat uncomfortably hard.

It is desirable to provide a snowmobile seat that does not retain moisture and is capable of quickly drying when moisture is absorbed.

SUMMARY OF THE INVENTION

According to a first aspect of the present invention, there is provided a snowmobile seat having a base section and a cushion. A cover can be disposed over the cushion. The base section is disposed over a tunnel of the snowmobile, the base section has a lower surface facing the tunnel and an upper surface. The cushion is disposed over the base section and has a lower surface facing the upper surface of the base section and an upper surface. A plurality of ventilation holes extend through the base section from the upper surface to the lower surface. A plurality of ridges are located on the lower surface of the base section to keep portions of the lower surface of the base section raised from the tunnel and a plurality of grooves are formed on the lower surface of the cushion.

According to a second aspect of the present invention there is provided a snowmobile seat having a base section and a cushion. The base section is disposed over a tunnel of the snowmobile and has a lower surface facing the tunnel and an upper surface. The cushion is disposed over the base section and has a lower surface facing the upper surface of the base section and an upper surface. A plurality of ventilation holes extend through the base section from the upper surface to the lower surface. Means are provided for keeping portions of the lower surface of the base section raised from the tunnel to allow moisture to wick away and a plurality of grooves are formed on the lower surface of the cushion.

According to a second aspect of the present invention there is provided a snowmobile seat having a base section and a cushion. The base section is disposed over a tunnel of the snowmobile and has a lower surface facing the tunnel and an upper surface. The cushion is disposed over the base section and has a lower surface facing the upper surface of the base section and an upper surface. A plurality of ventilation holes extend through the base section from the upper surface to the lower surface. Means are provided for keeping portions of the lower surface of the base section raised from the tunnel to allow moisture to wick away and a plurality of grooves are formed on the lower surface of the cushion. The means for keeping portions of the lower surface of the base section raised from the tunnel can be a rim located around an outer periphery of the base section.

BRIEF DESCRIPTION OF THE DRAWINGS

Reference will now be made to the drawings in which the various elements of the preferred embodiments of the present invention will be given numerical designations and in which the invention will be discussed so as to enable one skilled in the art to make and use the invention.

DETAILED DESCRIPTION OF THE PRESENTLY PREFERRED EMBODIMENTS

Figure 1:
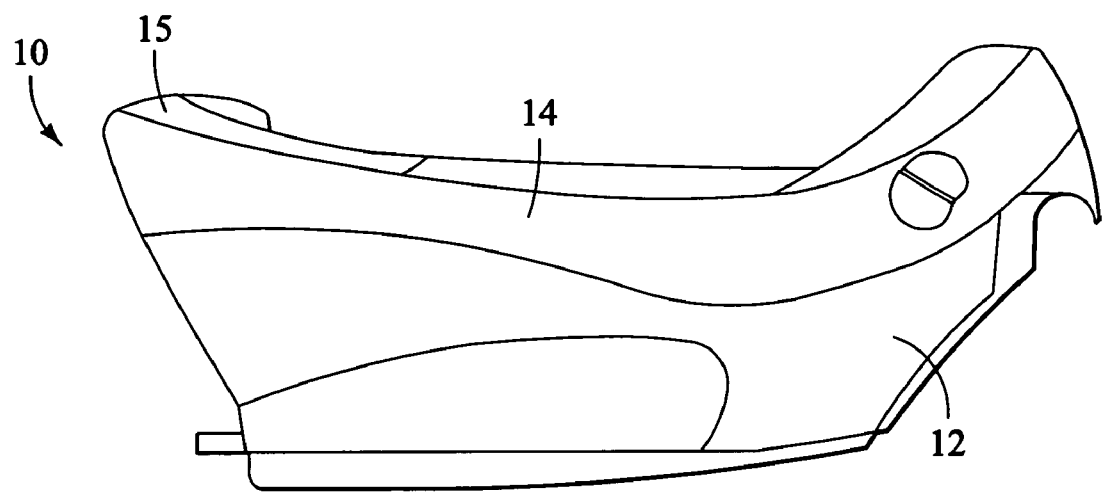
FIG. 1 is a side view of a snowmobile seat according to a preferred embodiment of the present invention.

FIG. 1 is a side view of a snowmobile seat 10 according to a preferred embodiment of the present invention. The snowmobile seat 10 includes two main parts, a base section 12 and a cushion 14. The base section 12 is disposed over a tunnel of the snowmobile chassis (shown in FIGS. 7–9) as is well known by those of ordinary skill in the art. The cushion 14 is disposed on the base section 12.

Figure 2:
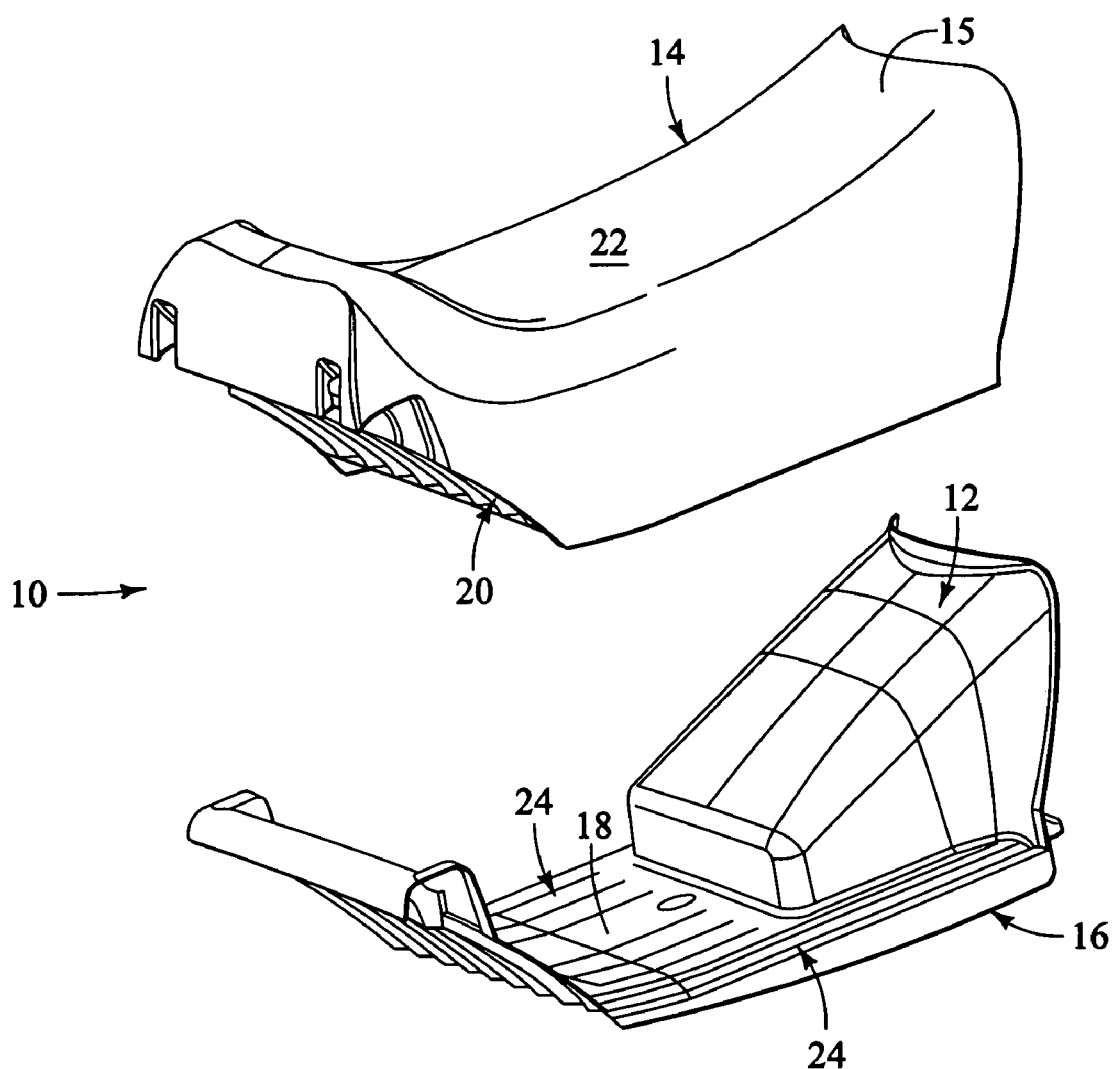
FIG. 2 is an exploded view of the snowmobile seat shown in FIG. 1.

FIG. 2 is an exploded view of the snowmobile seat 10 shown in FIG. 1. The design of the base section 12 and cushion 14 of a typical snowmobile has been modified so that the seat 10 provides ventilation for allowing moisture to wick away from the seat 10. The base section 12, which in a preferred embodiment is constructed of a relatively rigid material such as plastic, has a lower surface 16 which faces towards the tunnel of the snowmobile and an upper surface 18. The cushion 14 also has a lower surface 20 which is disposed on the upper surface 18 of the base section 12 and an upper surface 22. A cover 15 can be disposed over the cushion 14. The base section 12 has a plurality of ventilation holes 24 that extend from the upper surface 18 through the lower surface 16 which will be described in detail hereinafter. The lower surface 16 of the base section 12 will be described in detail with reference to FIG. 4. The lower surface 20 of the cushion 14 is complementary to the upper surface 18 of the base section 12.

Figure 3:
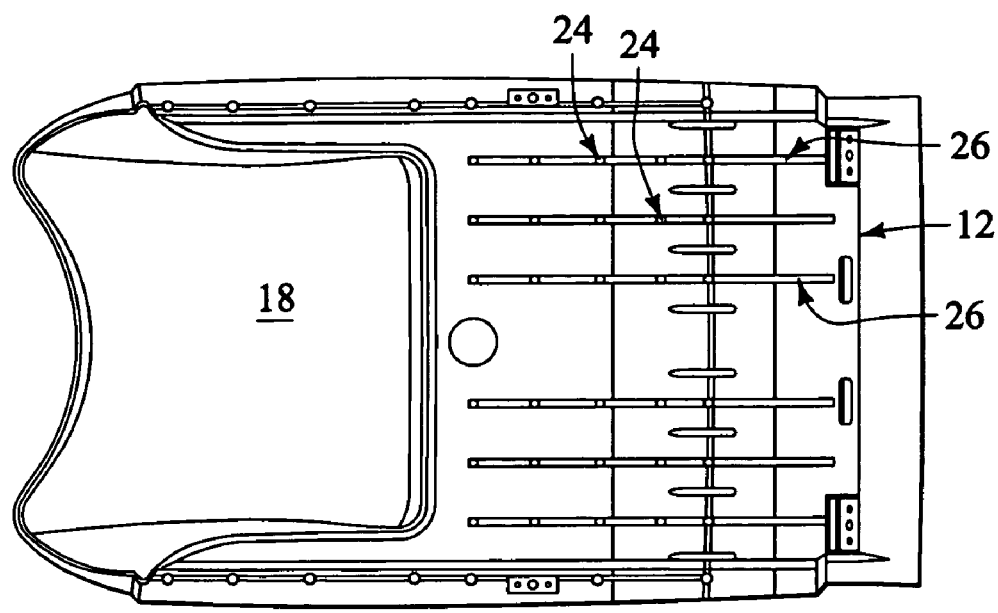
FIG. 3 is a top elevational view of a base section of the snowmobile seat shown in FIG. 1 according to a preferred embodiment of the present invention.

FIG. 3 is a top elevational view of the base section 12 of the snowmobile seat 10 shown in FIG. 1 according to a preferred embodiment of the present invention. There are a plurality of ventilation channels 26 extending over the upper surface 18 of the base section 12. Each channel 26 is a depression formed in the upper surface 18. The ventilation holes 24 are located in the channels 26.

Figure 4:
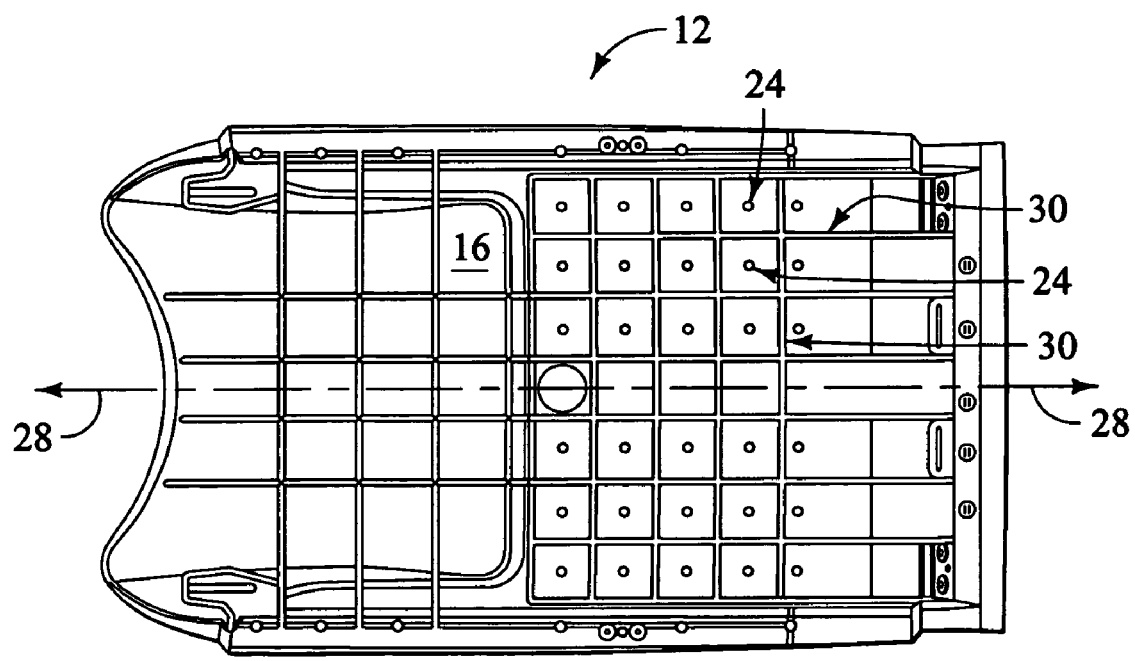
FIG. 4 is a bottom elevational view of a base section of the snowmobile seat shown in FIG. 1 according to a preferred embodiment of the present invention.

FIG. 4 is a bottom elevational view of a base section 12 of the snowmobile seat 10 shown in FIG. 1 according to a preferred embodiment of the present invention. There are ridges 30 that extend out from the lower surface 16 of the base section 12. These ridges 30 make contact with the snowmobile's tunnel and raise the lower surface 16 of the base section 12 off of the tunnel to create spaces between the lower surface 16 of the base section 12 and the tunnel where moisture can be wicked away as will be described in detail hereinafter. The ridges 30 on the lower surface of the base section 12 extend parallel to a first axis 28 of the base section 12 and perpendicular thereto.

Figure 5:
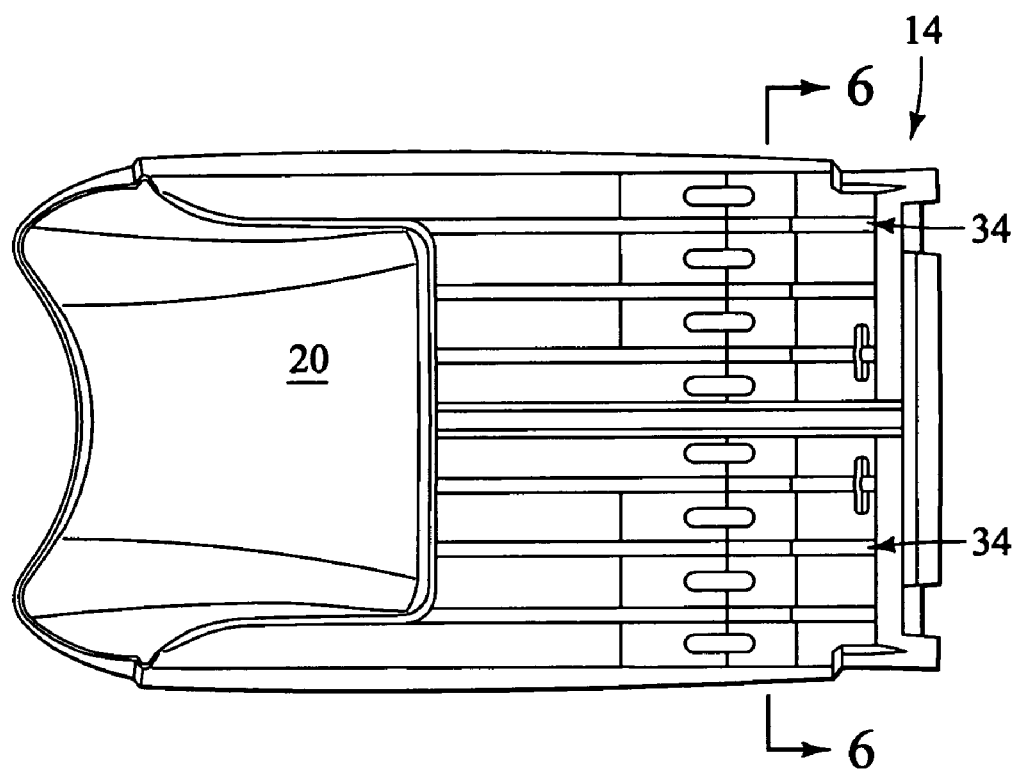
FIG. 5 is a bottom elevational view of the cushion section of the seat shown in FIG. 1 according to a preferred embodiment of the present invention.
Figure 6:
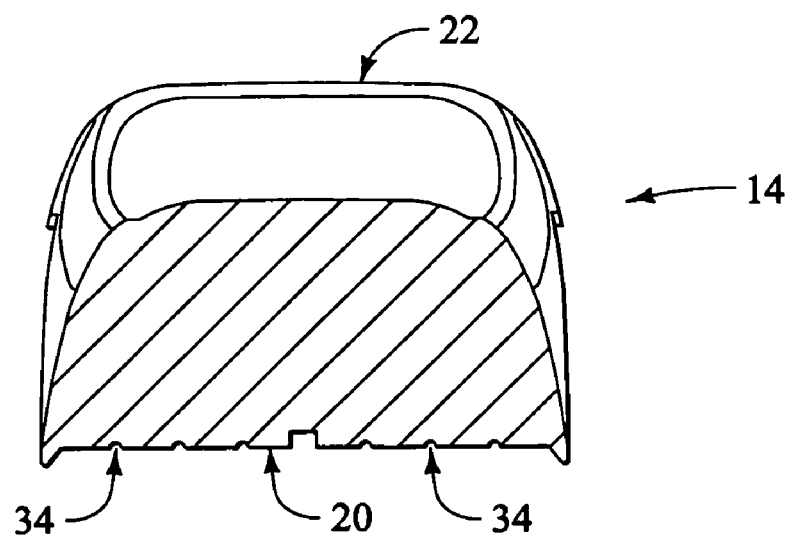
FIG. 6 is a cross-sectional view of the cushion section of the seat shown in FIG. 5 taken along lines 6—6.

FIG. 5 is a bottom elevational view of the cushion 14 of the seat 10 shown in FIG. 1 according to a preferred embodiment of the present invention. The lower surface 20 of the cushion 14 has a plurality of grooves 34 that run parallel to the first axis 28 of the base section. FIG. 6 is a cross-sectional view of the cushion 14 of the seat 10 shown in FIG. 5 taken along lines 6—6. The grooves 34 in the lower surface 20 of the cushion 14 can be seen. In a preferred embodiment, the location of each groove 34 coincides in position with one of the plurality of channels 26 of ventilation holes 24 in the upper surface 18 of the base section 12.

Figure 7:
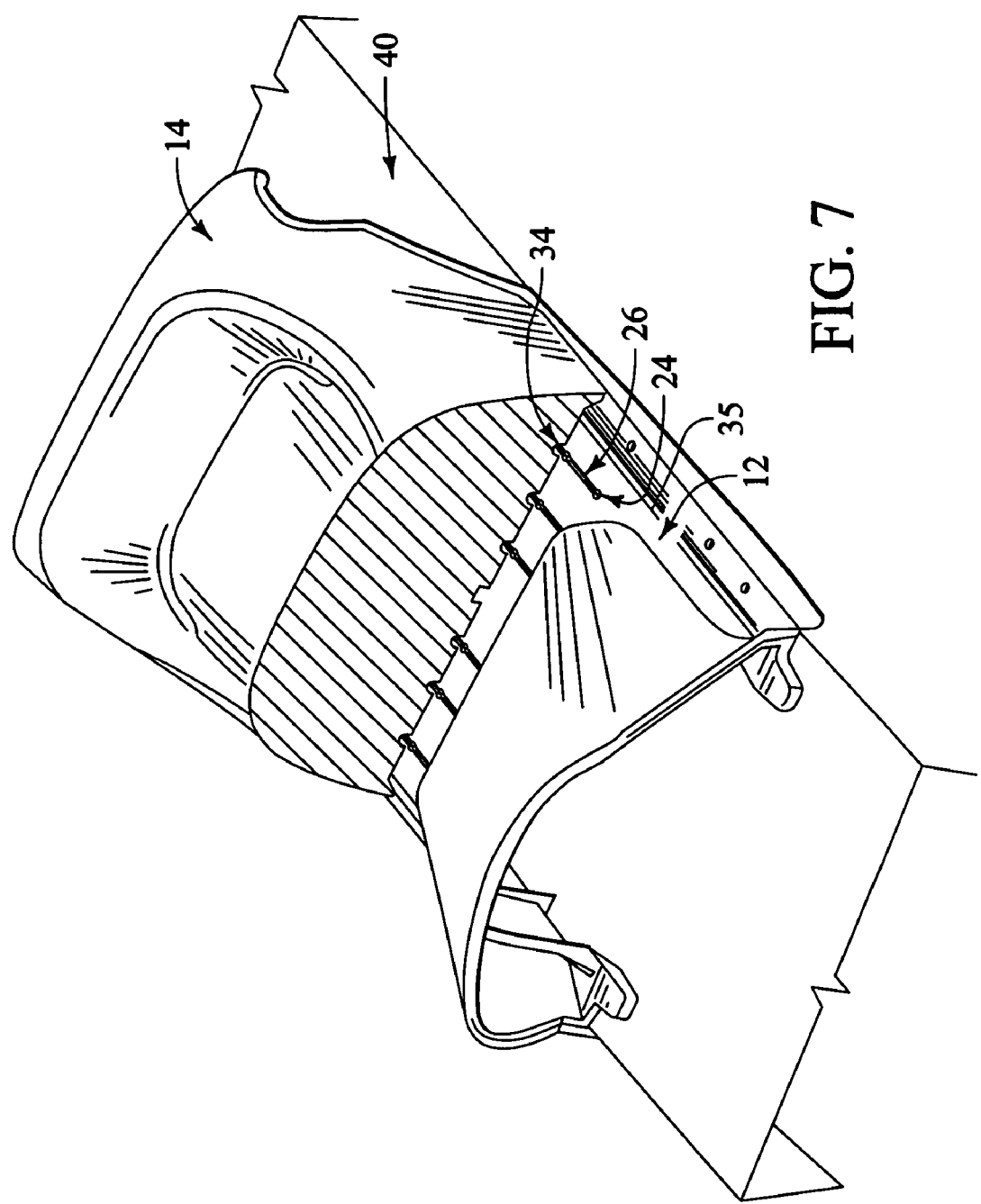
FIG. 7 is a perspective cutaway view of an assembled snowmobile seat according to a preferred embodiment of the present invention.

FIG. 7 is a perspective cutaway view of an assembled snowmobile seat according to a preferred embodiment of the present invention. The base section 12 is attached to the tunnel 40 by well known techniques. The cushion 14 is disposed on the base section 12 and secured thereto also by well known techniques. A rim 35 is located around an outer periphery of the base section 12 for keeping portions of the lower surface 20 of the base section raised from the tunnel 40. It can be seen that the grooves 34 formed in the lower side of the cushion 14 are aligned with the channels 26 formed in the upper surface of the base section 12.

Figure 8:
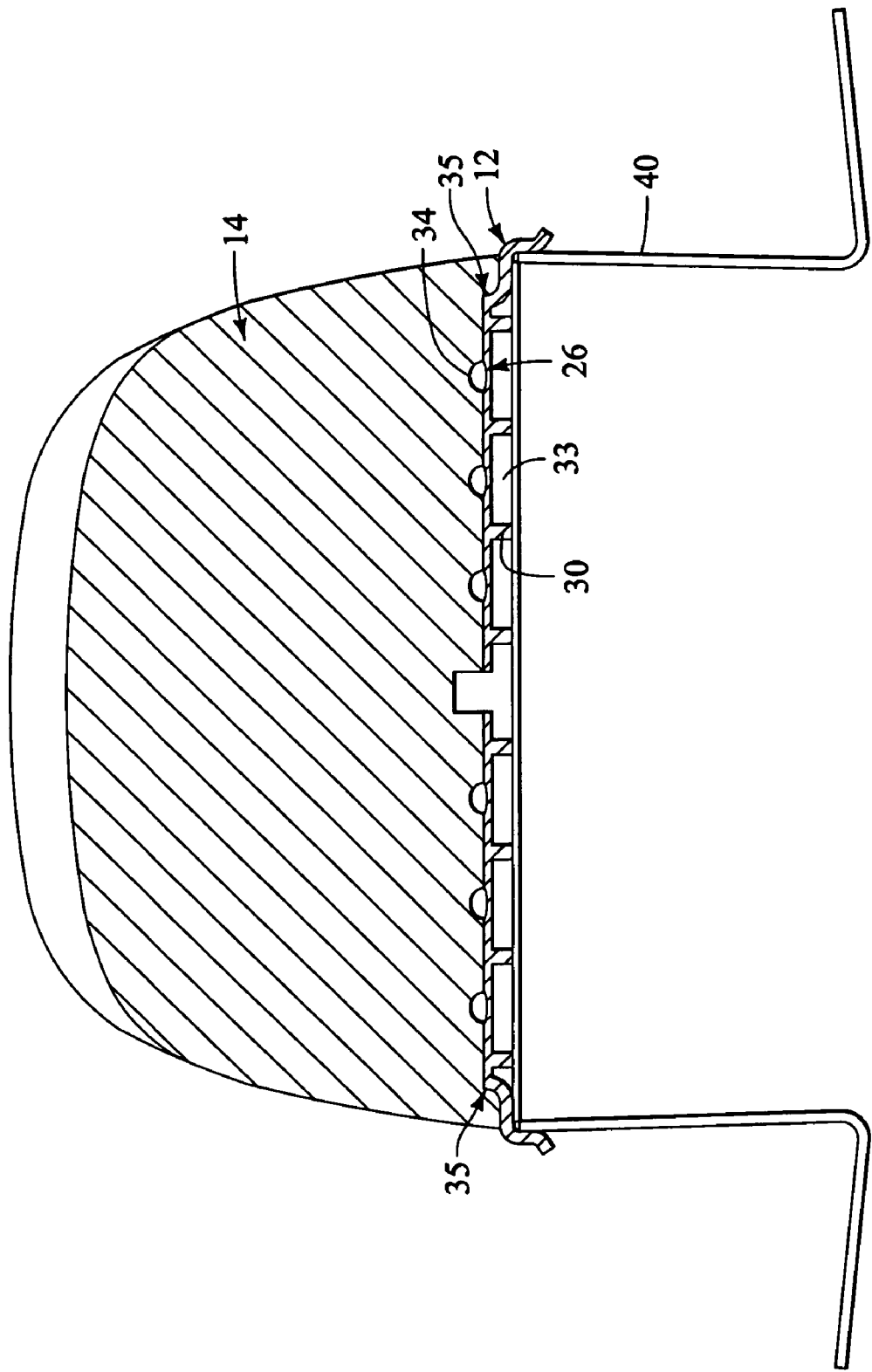
FIG. 8 is a cross-sectional view of the seat shown in FIG. 7 taken along an axis where the grooves in the cushion intersect with the ventilation channels formed in the base section.

FIG. 8 is a cross-sectional view of the seat shown in FIG. 7 taken along an axis where the grooves in the cushion intersect with the ventilation channels formed in the base section. It can be seen that the ridges 30 lift the lower surface of the base section from the tunnel 40.

Figure 9:
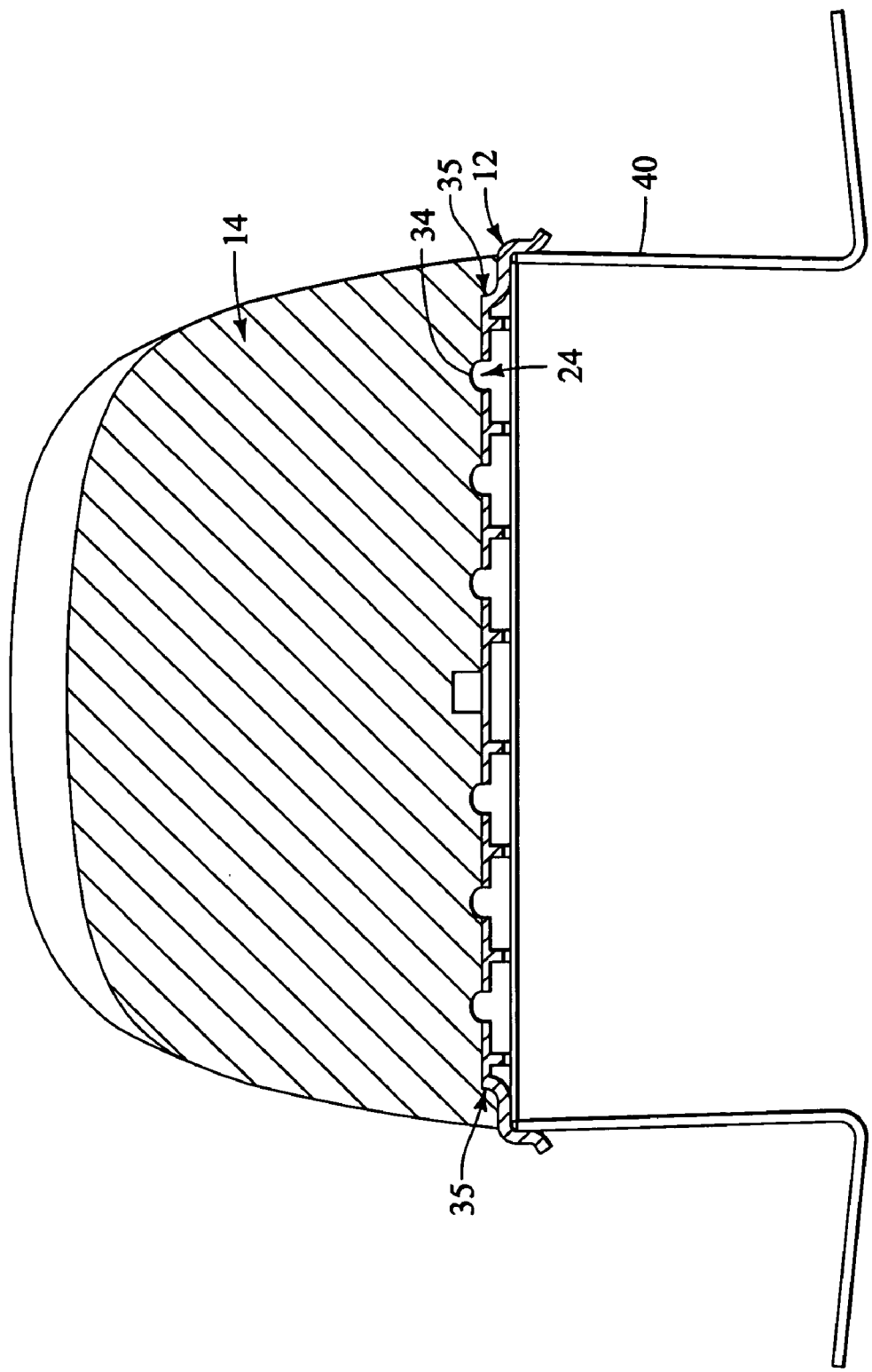
FIG. 9 is a cross-sectional view of the seat shown in FIG. 7 taken along an axis where the grooves in the cushion intersect with the ventilation holes formed in the base section.

FIG. 9 is a cross-sectional view of the seat shown in FIG. 7 taken along an axis where the grooves in the cushion intersect with the ventilation holes formed in the base section.

Figure 10:
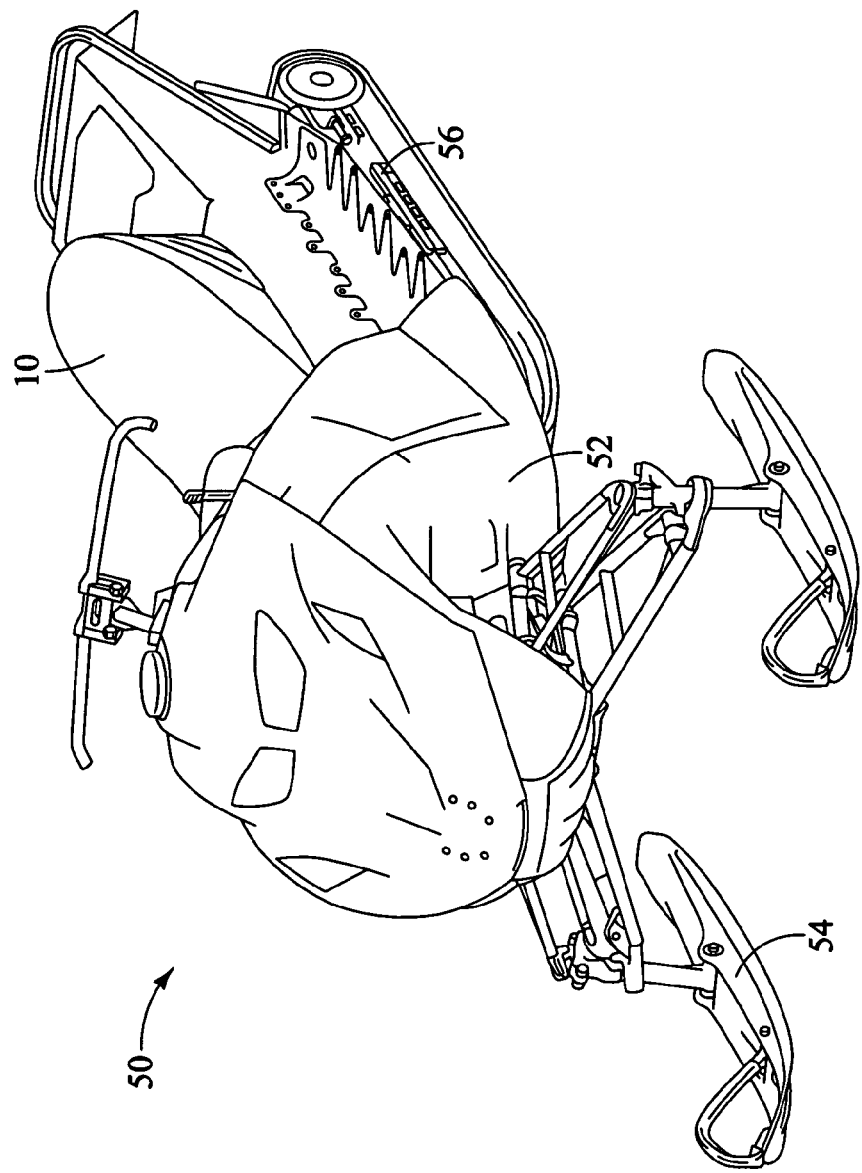
FIG. 10 is a view of a snowmobile incorporation a snowmobile seat according to a preferred embodiment of the present invention.

FIG. 10 illustrates a snowmobile 50 having a vehicle body 52 being supported by at least one steering ski 54 and being powered by a drive unit having an engine (not shown) and a track 56 and a seat 10.

The attachment of the base section 12 to the tunnel 40 is not airtight and thus air can enter and exit from between the tunnel and base section 12. The spaces formed between the lower surface of the base section 12 and the tunnel by the ridges 30 allows the air that enters between the tunnel 40 and base section 12 to flow and thus draw moisture from the cushion 14 through the ventilation holes 24. The grooves 34 formed in the lower surface 20 of the cushion 14 help direct dryer air to move deeper into the cushion which helps speed up the wicking process.

It is to be understood that the described preferred embodiments of the invention are illustrative only, and that modifications thereof may occur to those of ordinary skill in the art. Accordingly, this invention is not to be regarded as limited to the preferred embodiments disclosed, but is to be limited only as defined by the appended claims herein.

What is claimed is:

1. A snowmobile seat comprising:
    a base section disposed over a tunnel of the snowmobile, the base section having a lower surface facing the tunnel and an upper surface;
    a cushion disposed over the base section, the cushion having a lower surface facing the upper surface of the base section and an upper surface;
    a plurality of ventilation holes extending through the base section from the upper surface to the lower surface;
    a plurality of ridges located on the lower surface of the base section to keep portions of the lower surface of the base section raised from the tunnel; and
    a plurality of grooves formed on the lower surface of the cushion.

2. A snowmobile seat according to claim 1 wherein the base section is generally rigid.

3. A snowmobile seat according to claim 2 wherein the base section is constructed of plastic.

4. A snowmobile seat according to claim 1 further comprising a plurality of channels formed in the upper surface of the base section.

5. A snowmobile seat according to claim 4 wherein the ventilation holes are located in the plurality of channels.

6. A snowmobile seat according to claim 1 further comprising a cover disposed over the cushion.

7. A snowmobile seat according to claim 1 wherein the cushion is constructed of a compressible, open-cell material.

8. A snowmobile seat according to claim 1 wherein the ventilation holes are arranged in a plurality of rows extending parallel to a first axis of the base section.

9. A snowmobile seat according to claim 8 wherein the grooves formed in the lower surface of the cushion are arranged in a plurality of rows that coincide with the plurality of holes formed in the base section.

10. A snowmobile seat according to claim 1 wherein the ridges formed on the lower surface of the base section include a first set of ridges that extend parallel to a first axis of the base section and a second set of ridges that extend perpendicularly to the first set of ridges.

11. A snowmobile seat comprising:
    a base section disposed over a tunnel of the snowmobile, the base section having a lower surface facing the tunnel and an upper surface;
    a cushion disposed over the base section, the cushion having a lower surface facing the upper surface of the base section and an upper surface;
    a plurality of ventilation holes extending through the base section from the upper surface to the lower surface;
    means for keeping portions of the lower surface of the base section raised from the tunnel to allow moisture to wick away; and
    a plurality of grooves formed on the lower surface of the cushion.

12. A snowmobile seat according to claim 11 wherein the means for keeping portions of the lower surface of the base section raised from the tunnel comprises a rim located around an outer periphery of the base section.

13. A snowmobile seat according to claim 11 wherein the base section is generally rigid.

14. A snowmobile seat according to claim 13 wherein the base section is constructed of plastic.

15. A snowmobile seat according to claim 11 further comprising a plurality of channels formed in the upper surface of the base section.

16. A snowmobile seat according to claim 15 wherein the ventilation holes are located in the plurality of channels.

17. A snowmobile seat according to claim 11 further comprising a cover disposed over the cushion.

18. A snowmobile seat according to claim 11 wherein the cushion is constructed of a compressible, open-cell material.

19. A snowmobile seat according to claim 11 wherein the ventilation holes are arranged in a plurality of rows extending parallel to a first axis of the base section.

20. A snowmobile seat according to claim 19 wherein the grooves formed in the lower surface of the cushion are arranged in a plurality of rows that coincide with the plurality of holes formed in the base section.

21. A snowmobile seat according to claim 11 wherein the means for keeping portions of the lower surface of the base section raised from the tunnel comprises ridges formed on the lower surface of the base section include a first set of ridges that extend parallel to a first axis of the base section and a second set of ridges that extend perpendicularly to the first set of ridges.

22. A snowmobile comprising:
- a vehicle body being supported by at least one steering ski and being powered by a drive unit having an engine and a track; and
- a seat including:
- a base section disposed over a tunnel of the snowmobile, the base section having a lower surface facing the tunnel and an upper surface;
- a cushion disposed over the base section, the cushion having a lower surface facing the upper surface of the base section and an upper surface;
- a plurality of ventilation holes extending through the base section from the upper surface to the lower surface;
- a plurality of ridges located on the lower surface of the base section to keep portions of the lower surface of the base section raised from the tunnel to allow moisture to wick away; and
- a plurality of grooves formed on the lower surface of the cushion.

* * * * *